(12) United States Patent
Schuh et al.

(10) Patent No.: US 12,184,132 B2
(45) Date of Patent: Dec. 31, 2024

(54) METHOD FOR MANUFACTURING A MAGNETIC SHEET AND A STACK OF MAGNETIC SHEETS AND ELECTRIC MACHINE AND ELECTRIC VEHICLE

(71) Applicant: Siemens Aktiengesellschaft, Munich (DE)

(72) Inventors: Carsten Schuh, Baldham (DE); Rolf Vollmer, Gersfeld (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 385 days.

(21) Appl. No.: 17/601,499

(22) PCT Filed: Mar. 19, 2020

(86) PCT No.: PCT/EP2020/057611
§ 371 (c)(1),
(2) Date: Oct. 5, 2021

(87) PCT Pub. No.: WO2020/207739
PCT Pub. Date: Oct. 15, 2020

(65) Prior Publication Data
US 2022/0200418 A1 Jun. 23, 2022

(30) Foreign Application Priority Data
Apr. 9, 2019 (EP) .................................... 19168227

(51) Int. Cl.
*H02K 15/02* (2006.01)
*B33Y 10/00* (2015.01)
(Continued)

(52) U.S. Cl.
CPC .............. *H02K 15/02* (2013.01); *B33Y 10/00* (2014.12); *B33Y 80/00* (2014.12); *H02K 15/10* (2013.01)

(58) Field of Classification Search
CPC ........ H02K 15/02; H02K 15/10; B33Y 10/00; B33Y 80/00
See application file for complete search history.

(56) References Cited

U.S. PATENT DOCUMENTS

| 10,903,729 B1* | 1/2021 | Cunnyngham .......... H02K 3/02 |
| 2003/0062791 A1 | 4/2003 | Frederick, Jr. et al. . 310/156.53 |

(Continued)

FOREIGN PATENT DOCUMENTS

| CN | 103117608 A | 5/2013 | ............. B32B 38/08 |
| CN | 104205571 A | 12/2014 | ............... H02K 1/24 |

(Continued)

OTHER PUBLICATIONS

Chinese Office Action, Application No. 202080027611.9, 8 pages, Oct. 19, 2023.

(Continued)

*Primary Examiner* — Jeffrey T Carley
(74) *Attorney, Agent, or Firm* — Slayden Grubert Beard PLLC

(57) ABSTRACT

Various embodiments include a method for manufacturing a magnetic sheet comprising: positioning a nonmagnetic sheet with recessed regions; filling the recessed regions with a soft-magnetic material using additive manufacturing; and fixing the soft-magnetic material to the sheet in a material-bonded manner.

6 Claims, 3 Drawing Sheets

(51) Int. Cl.
    *B33Y 80/00*           (2015.01)
    *H02K 15/10*         (2006.01)

(56) References Cited

U.S. PATENT DOCUMENTS

| | | | | |
|---|---|---|---|---|
| 2004/0201301 | A1* | 10/2004 | Regan | H02K 1/246 |
| | | | | 310/156.53 |
| 2012/0156441 | A1* | 6/2012 | Gerster | H01F 1/18 |
| | | | | 156/60 |
| 2015/0015093 | A1 | 1/2015 | Gontermann et al. | 310/44 |
| 2015/0179320 | A1 | 6/2015 | Furusawa et al. | 310/156.38 |
| 2016/0056674 | A1 | 2/2016 | Buettner et al. | 310/46 |
| 2017/0342519 | A1 | 11/2017 | Uesaka et al. | |
| 2018/0183279 | A1* | 6/2018 | Kool | H01F 1/344 |
| 2018/0233977 | A1 | 8/2018 | Volkmuth | H02K 1/32 |
| 2018/0323666 | A1 | 11/2018 | Patel | H02K 1/27 |
| 2019/0020232 | A1 | 1/2019 | Büttner | H02K 1/22 |
| 2019/0305616 | A1 | 10/2019 | Bittner | H02K 1/246 |

FOREIGN PATENT DOCUMENTS

| | | | | |
|---|---|---|---|---|
| CN | 104641434 A | | 5/2015 | B22F 1/00 |
| CN | 105122594 A | | 12/2015 | H02K 1/24 |
| CN | 105164895 A | | 12/2015 | H02K 1/24 |
| CN | 107112124 A | | 8/2017 | C21D 8/12 |
| CN | 110459376 A | * | 11/2019 | H01F 1/147 |
| DE | 102016214542 A1 | | 2/2018 | H02K 1/22 |
| DE | 102016119650 A1 | | 4/2018 | B22F 3/105 |
| DE | 102021106558 A1 | * | 2/2022 | H02K 1/02 |
| EP | 2 693 612 | | 2/2014 | H02K 15/02 |
| EP | 3 131 189 | | 2/2017 | H02K 21/40 |
| EP | 3179604 | * | 6/2017 | |
| EP | 3179604 A1 | | 6/2017 | H02K 1/24 |
| EP | 3 193 431 | | 7/2017 | H02K 1/24 |
| EP | 3 255 758 | | 12/2017 | H02K 1/24 |
| EP | 3731372 A1 | * | 10/2020 | |
| JP | 11144930 A | | 5/1999 | H01F 1/16 |
| JP | 2013208023 A | * | 10/2013 | B21D 39/00 |
| WO | WO-2021048836 A1 | * | 3/2021 | H02K 1/02 |

OTHER PUBLICATIONS

Chinese Office Action, Application No. 202080027611.9, 7 pages, Feb. 21, 2024.

Search Report for International Application No. PCT/EP2020/057611, 12 pages, Jun. 3, 2020.

* cited by examiner

METHOD FOR MANUFACTURING A MAGNETIC SHEET AND A STACK OF MAGNETIC SHEETS AND ELECTRIC MACHINE AND ELECTRIC VEHICLE

CROSS-REFERENCE TO RELATED APPLICATIONS

This application is a U.S. National Stage Application of International Application No. PCT/EP2020/057611 filed Mar. 19, 2020, which designates the United States of America, and claims priority to EP Application No. 19168227.7 filed Apr. 9, 2019, the contents of which are hereby incorporated by reference in their entirety.

TECHNICAL FIELD

The present disclosure relates to magnetic sheets. Various embodiments of the teachings herein may include methods for manufacturing a magnetic sheet, stacks of magnetic sheets, electric machines, and/or electric vehicles.

BACKGROUND

Some methods for producing magnetic sheets for electric machines use stencil printing starting with metal powders, from which a printing paste is first created, which is then processed by means of stencil printing technology into a green body in the form of a thick film. This green body is then transformed by thermal treatment, in other words by means of debinding and sintering, into a metallic, structured sheet in the form of a magnetic sheet. It is known for multicomponent magnetic sheets also to be produced in this way. To this end, the various components of a magnetic sheet are printed sequentially one after another onto a carrier plate and thereafter are collectively thermally treated. However, not all materials can be used for sintering in this method. In particular, the sintering of warp-free and dense sinter material is difficult to achieve in this way.

SUMMARY

Teachings of the present disclosure include methods for manufacturing a multicomponent magnetic sheet which overcomes the disadvantages mentioned in the introduction as well as stacks of magnetic sheets, electric machines, and/or electric vehicles. For example, some embodiments of the teachings herein include a method for manufacturing a magnetic sheet (20), in which a nonmagnetic sheet (30) which is flat in extension is used which has recessed regions (40) along the flat extension, wherein these regions (40) are filled by means of additive manufacturing of a soft-magnetic material (50) which is fixed to the sheet (30) in a material-bonded manner.

In some embodiments, the additive manufacturing takes place by means of powder deposition welding and/or by means of a wire-based electric arc and/or by means of cold metal transfer, in particular laser-based and/or electric-arc-based, and/or by means of printing of particle-filled pastes.

In some embodiments, a nonmagnetic sheet (30) is used in which at least one punched part and/or one cut part, in particular a laser cut part, and/or a screen printing and/or stencil printing part is used and/or manufactured.

In some embodiments, an electrical insulation material (60) is arranged on the magnetic sheet (20) on or along at least one flat extension of the magnetic sheet (20).

In some embodiments, multiple magnetic sheets (20) are manufactured with a method as described herein, and in which the magnetic sheets (20) are stacked.

In some embodiments, the magnetic sheets (20) are tempered and/or thermally treated and/or debound and/or sintered before they are stacked.

In some embodiments, the magnetic sheets (20) are rolled before they are stacked.

As another example, some embodiments include a stack of magnetic sheets, produced in accordance with a method as described herein, in which the magnetic sheets (20) are stacked following one another along a stack direction (S), wherein the regions (40) that are filled with soft-magnetic material (50) by means of additive manufacturing preferably do not all completely overlap.

As another example, some embodiments include an electric machine with a rotor (100) and/or stator (200), which is formed with a stack of magnetic sheets (10) as described herein and/or with a method as described herein.

As another example, some embodiments include an electric vehicle with an electric machine (300) as described herein.

BRIEF DESCRIPTION OF THE DRAWINGS

The teachings herein are further explained in greater detail below on the basis of an exemplary embodiment illustrated in a drawing, in which.

DETAILED DESCRIPTION

Figure 1:
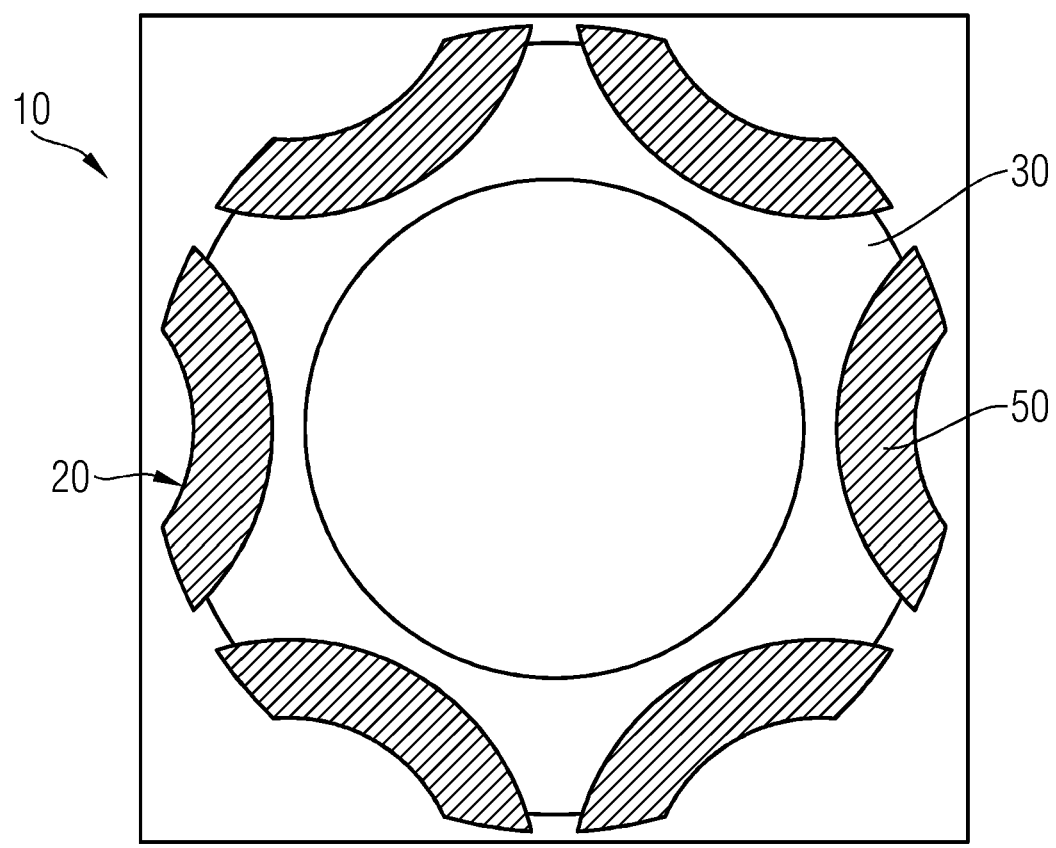
FIG. 1 schematically shows a stack of magnetic sheets incorporating teachings of the present disclosure in a top view.

The present disclosure describes methods for manufacturing a magnetic sheet, in which use is made of a sheet, in some cases nonmagnetic, which is flat in extension. A sheet is used which has recessed regions along the flat extension, wherein these regions are filled by means of additive manufacturing of a soft-magnetic material which is fixed to the sheet in a material-bonded manner. The soft-magnetic material may be fixed to the sheet in a material-bonded manner during or as a result of the additive manufacturing. In this way, multicomponent magnetic sheets can also be produced with components such as these which are chemically incompatible or which exhibit very different shrinkages in co-sintering methods. Furthermore, multicomponent sheets can also be manufactured from components such as these which are not available in a sinterable powder form which is inexpensive to produce. The methods further permit greater degrees of freedom in the composition of multicomponent magnetic sheets, since the magnetic sheets are easily stackable and stacked magnetic sheets need not necessarily be formed identically. In particular, in the case of a stack of manufactured magnetic sheets the soft-magnetic material is not subject to any geometric restrictions in terms of its spatial arrangement within this stack.

In the context of the present disclosure, "recessed regions" can mean those regions which have been recessed, i.e. hollowed out, during the manufacture of the sheet, in particular during additive manufacturing of the sheet. In some embodiments, those regions which have been recessed subtractively from a previously manufactured sheet in the form of recesses, i.e. subtractively removed, for example by means of punching and/or cutting, in particular laser cutting or water jet cutting, can also be regarded as "recessed regions".

In some embodiments, the additive manufacturing takes place by means of powder deposition welding and/or by means of a wire-based electric arc and/or by means of cold metal transfer, in particular laser-based and/or electric-arc-based. The manufacturing methods referred to make additive manufacturing efficient and simple, wherein the additively manufactured material enters into a particularly stable material-bonded connection with the substrate on which the material of additive manufacturing is deposited. In this way a material-bonded connection of the additively manufactured material to the sheet can consequently be achieved particularly easily.

In some embodiments, the additive manufacturing takes place by means of printing of particle-filled pastes. In this way too a material-bonded connection of additively manufactured material to the sheet can easily be achieved.

In some embodiments, a nonmagnetic sheet is used, in which at least one punched part and/or one cut part, in particular a laser cut and/or screen printed part and/or stencil printed part is used as a sheet. In some embodiments, the punched part and/or cut part, in particular the laser cut part and/or screen printed and/or stencil printed part, is manufactured. This means the sheet may be manufactured by means of punching and/or cutting and/or laser cutting and in this case in particular by means of subtractive removal of material for the formation of the recessed regions, and/or by means of screen printing and in this case in particular by means of hollowing out of the recessed regions. In this case the nonmagnetic sheet and the soft-magnetic material need not be manufactured by means of the same manufacturing techniques, such that in particular shrinkage progressions of differing strength of the various materials do not prevent the manufacture of the magnetic sheet.

In some embodiments, an electrical insulation material is arranged as appropriate on or along at least one flat extension of the magnetic sheet.

In some embodiments, not just one magnetic sheet is manufactured, but multiple magnetic sheets are manufactured by means of the methods as described herein, wherein the magnetic sheets are stacked as an additional method step. Thus, not just a single magnetic sheet is manufactured, but a stack of magnetic sheets. By means of such a stack of magnetic sheets a rotor and/or a stator of an electric machine can be manufactured, such that the methods described herein can be used for manufacturing an electric machine.

In some embodiments, the magnetic sheets are thermally processed, in particular tempered and/or thermally treated and/or debound and/or sintered before they are stacked. In some embodiments, the magnetic sheets are rolled before they are stacked. In the case of thermal processing, the magnetic sheets can be manufactured by means of printing of particle-filled pastes. The microstructure of the magnetic sheets can be modified by means of tempering or afterglow processes. In particular, grain growth and/or interdiffusion at material-bonded connection points and/or texturings of the magnetic sheets can be adjusted. By rolling the magnetic sheets a homogeneous sheet thickness of the magnetic sheets and a homogeneous surface of the magnetic sheets can moreover be achieved.

In some embodiments, the magnetic sheets of the stack of magnetic sheets are stacked following one another along a stack direction, wherein those regions that are filled with soft-magnetic material by means of additive manufacturing preferably do not necessary all completely overlap. In some embodiments, the regions that are filled with soft-magnetic material by means of additive manufacturing do not completely overlap, any geometries of soft-magnetic material can be achieved along the stack direction. In some embodiments, the magnetic structure of the stack of magnetic sheets can consequently be set at will.

In some embodiments, the electric machine has a rotor and/or stator formed with a stack of magnetic sheets as described herein and/or with an inventive method for manufacturing a stack of magnetic sheets as described above and/or with an inventive method for manufacturing a magnetic sheet as described above.

In some embodiments, a vehicle is formed with an electric machine of this type as described herein.

Figure 2:
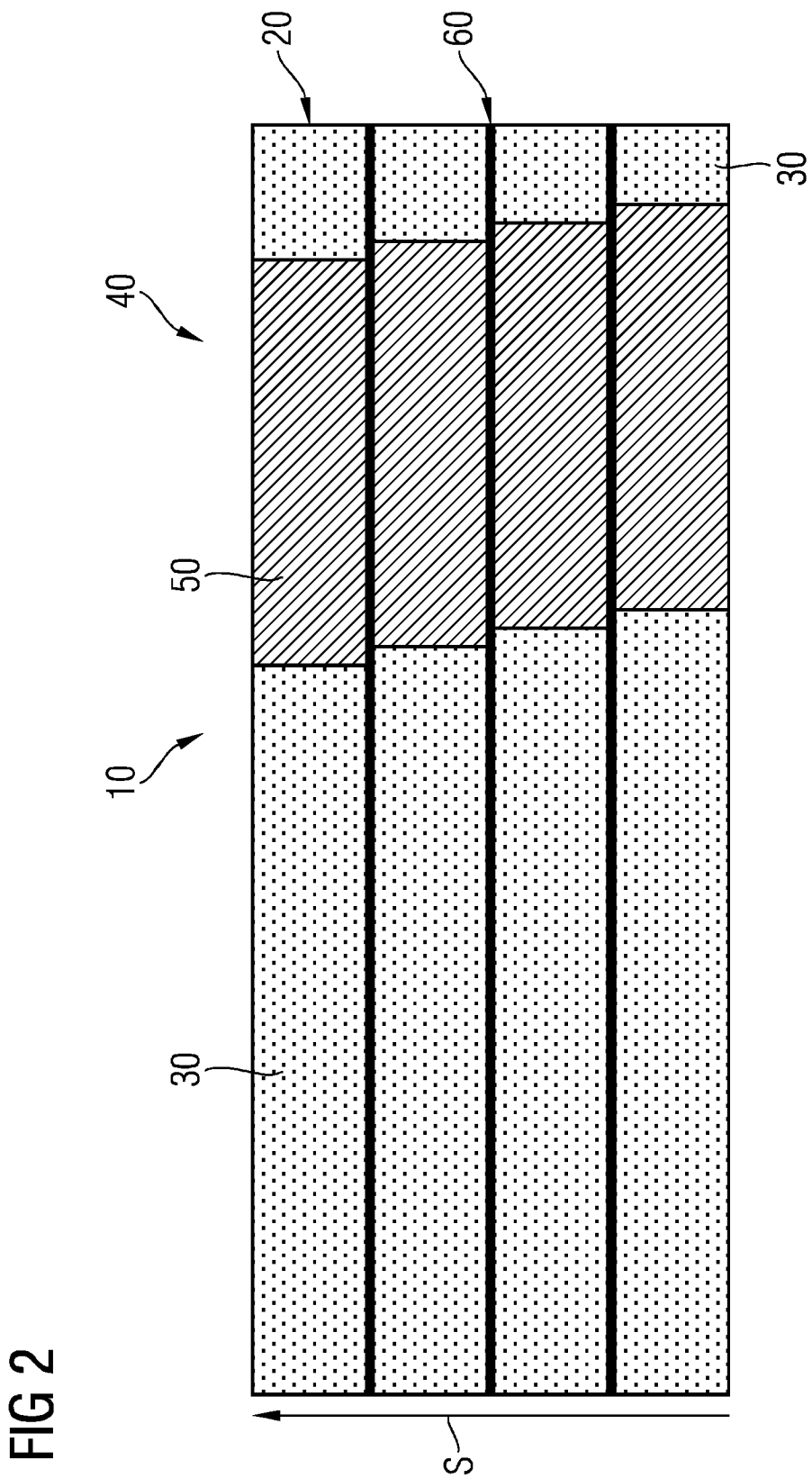
FIG. 2 schematically shows the stack of magnetic sheets from FIG. 1 in cross-section.

The stack of magnetic sheets 10 shown in FIGS. 1 and 2 is manufactured using one or more methods described herein and has magnetic sheets 20. The magnetic sheets 20 each comprise a prefabricated nonmagnetic metal sheet 30, in which in the flat extension a region 40 is recessed which is filled with soft-magnetic material 50. The region 40 is for example recessed by the metal sheet 30 in each case having been manufactured by means of screen printing and the region 40 having been hollowed out during the screen printing.

In some embodiments, the metal sheet 30 can in each case also be manufactured by the metal sheet 30 first being manufactured in full and then material being subtractively removed from the metal sheet 30 along the regions 40, for example by means of punching or laser cutting or water jet cutting. The aforementioned manufacturing steps for manufacturing the metal sheets 30 are in further exemplary embodiments in each case steps of the methods for manufacturing the inventive magnetic sheets 20 and the stack of magnetic sheets 10.

In the exemplary embodiment shown, the soft-magnetic material 50 is introduced into the region 40 by means of powder deposition welding, such that the soft-magnetic material 50 is connected to the metal sheet 30 in a material-bonded manner. In some embodiments, the soft-magnetic material 50 can also be additively deposited by means of a wire-based arc welding method and/or by means of cold metal transfer, in particular laser-based or electric-arc-based. In some embodiments, soft-magnetic material is introduced additively into the region 40 by means of printing pastes, which have particles of soft-magnetic material.

The magnetic sheets 20 have, as shown in FIG. 2, a horizontally extending flat extension. The magnetic sheets 20 are stacked in a vertical direction, in other words along a vertical stack direction S. The region 40 of soft-magnetic material 50 does not overlap completely in the stack direction S in the case of successive magnetic sheets 20: instead, the region 40 of soft-magnetic material 50 is offset in the horizontal direction, in other words in the direction of the flat extension, in the case of progressions in the vertical direction. The soft-magnetic material 50 consequently does not extend along a mathematical cylinder extending in the stack direction, but rather the region of the soft-magnetic material 50 runs in a slightly inclined manner compared to the stack direction.

The magnetic sheets 20 form the stack of magnetic sheets 10 such that the magnetic sheets 20 are rolled before they are stacked. In the case of a formation of the soft-magnetic material 50 by means of printing particle-filled pastes, the magnetic sheets 20 are moreover tempered and/or thermally treated and/or debound and/or sintered before they are combined to form the stack of magnetic sheets 10. Before being combined to form the stack of magnetic sheets 10 the magnetic sheets 20 are additionally provided with an insulation layer 60 which is deposited onto the flat extensions of the magnetic sheets 20. In the exemplary embodiment shown, the insulation layer 60 is a paint.

In principle the insulation layer 60 can also be formed in another manner. By means of the insulation layer 60 the magnetic sheets 20 are electrically insulated from one another. The magnetic sheets 20 are stacked one on the other in the stack direction S and thus form the inventive stack of magnetic sheets 10.

Figure 3:
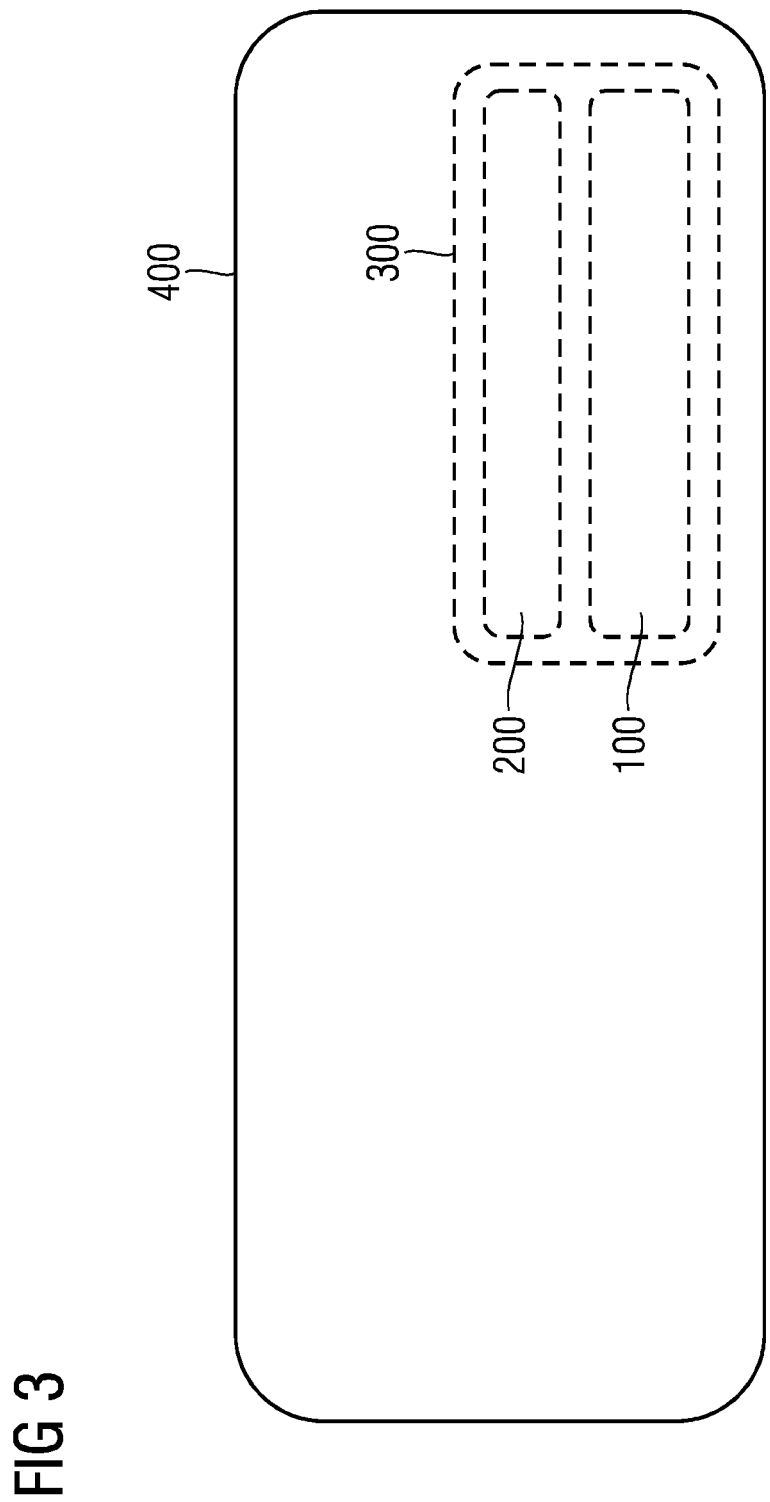
FIG. 3 schematically shows an example electric vehicle with an electric machine with a rotor and a stator, each with a stack of magnetic sheets as shown in FIGS. 1 and 2 in a schematic diagram.

The electric machine 300 shown in FIG. 3 has a rotor 100 and a stator 200, wherein both the rotor 100 and the stator 200 are formed with a stack of magnetic sheets 10 as described above. The electric vehicle 400 schematically illustrated in FIG. 3 is for example a hybrid-electric aircraft and has the previously described electric machine 300.

What is claimed is:

1. A method for manufacturing a stack of magnetic sheets, the method comprising:

fabricating individual non-magnetic sheets by punching and/or cutting, including creating recessed regions along a flat extension of the non-magnetic sheets;

filling the recessed regions of the fabricated individual sheets with soft-magnetic material by additive manufacturing to create material bonds at connection points;

tempering the filled individual sheets; and stacking the tempered individual sheets.

2. The method according to claim 1, wherein the additive manufacturing includes powder deposition welding, wire-based electric arc, cold metal transfer, or printing of particle-filled pastes.

3. The method according to claim 1, wherein fabricating the individual non-magnetic sheets includes laser cutting, screen printing, or stencil printing.

4. The method according to claim 1, further comprising arranging an electrically insulating material on at least one of the tempered individual sheets before stacking.

5. The method according to claim 1, further comprising rolling the tempered individual sheets before stacking.

6. The method according to claim 1, wherein stacking the tempered individual sheets includes positioning the respective filled recessed regions of the individual sheets without complete overlap.

* * * * *